United States Patent
Seurre et al.

(10) Patent No.: US 8,481,617 B2
(45) Date of Patent: Jul. 9, 2013

(54) ADJUVANT SYSTEM FOR PREFABRICATED CONCRETE

(75) Inventors: Jerome Seurre, Reims (FR); Bruno Pellerin, Avon (FR); Jean-Philippe Bigas, Pithiviers le Vieil (FR)

(73) Assignee: Chryso, Issy les Moulineaux (FR)

( * ) Notice: Subject to any disclaimer, the term of this patent is extended or adjusted under 35 U.S.C. 154(b) by 0 days.

(21) Appl. No.: 13/255,467

(22) PCT Filed: Mar. 12, 2010

(86) PCT No.: PCT/FR2010/050438
§ 371 (c)(1),
(2), (4) Date: Nov. 22, 2011

(87) PCT Pub. No.: WO2010/103253
PCT Pub. Date: Sep. 16, 2010

(65) Prior Publication Data
US 2012/0059090 A1    Mar. 8, 2012

(30) Foreign Application Priority Data
Mar. 12, 2009 (FR) ...................................... 09 51547

(51) Int. Cl.
*C04B 24/26* (2006.01)
*C08K 5/5317* (2006.01)

(52) U.S. Cl.
USPC ................ 524/5; 524/131; 524/420; 524/429

(58) Field of Classification Search
USPC ..................................... 524/5, 131, 420, 429
See application file for complete search history.

(56) References Cited

U.S. PATENT DOCUMENTS

| | | | |
|---|---|---|---|
| 5,531,825 A * | 7/1996 | Gartner et al. | 106/808 |
| 5,879,445 A | 3/1999 | Guicquero et al. | |
| 6,478,868 B1 * | 11/2002 | Reddy et al. | 106/696 |
| 2004/0050302 A1 | 3/2004 | Casanova et al. | |
| 2006/0207479 A1 | 9/2006 | Hughes | |
| 2008/0072800 A1 * | 3/2008 | Hughes | 106/816 |

FOREIGN PATENT DOCUMENTS

| | | |
|---|---|---|
| FR | 2 696 736 A1 | 4/1994 |
| FR | 2 892 420 A1 | 4/2007 |
| WO | WO 02/18291 A1 | 3/2002 |
| WO | WO 2009/024105 A1 | 2/2009 |

OTHER PUBLICATIONS

A. Goncalves et al., "Comparative Study of influence of superplasticizers and superplasticizer/plasticizer blends on slump-loss," American Concrete Institute, SP-195, 2000, pp. 321-333, XP8115367, ISSN: 0193-2527.

"Chryso Fluid Optima & Fluid Premia, Time challenging admixtures," Chryso Product Brochure, Dec. 14, 2006, pp. 1-8, XP002556541, retrieved from Internet Nov. 20, 2009. <http://fr.chryso.com/upload/t_documents/Fichier_L2/23004/2005_Doc_Optima_Premia-pour_wev.pdf>.

"Chryso Fluid Premia 196," Chryso Technical Data Sheet. Mar. 2006, pp. 1-2, XP002556542, retrieved from Internet Nov. 20, 2009. <http://fr.chryso.com/upload/t_documents/Fichier_L2/48629/FT_CHYRSO_Fluid_Premia_196_gb.pdf>.

"Chryso Fluid Optima 100," Chryso Technical Data Sheet, Feb. 2006, pp. 1-2, XP002556543, retrieved from Internet Nov. 20, 2009. <http://fr.chryso.com/upload/t_documents/Fichier_L2/48629/FT_CHYRSO_Fluid_Premia_196_gb.pdf>.

* cited by examiner

*Primary Examiner* — John Uselding
(74) *Attorney, Agent, or Firm* — McDermott Will & Emery

(57) ABSTRACT

The present invention relates to a system of adjuvants for concrete comprising a superplasticizer, such as a polyalkoxylated polycarboxylate comb polymer; an accelerator selected from calcium salts; and a rheology extender, which is a polyalkoxylated polyphosphonate. The system of adjuvants is particularly useful for prefabricated concrete, which is used for producing concrete building elements in series such as slabs, walls, beams, frontage panels. Methods for preparing prefabricated concrete using this system of adjuvants are also provided.

14 Claims, No Drawings

ADJUVANT SYSTEM FOR PREFABRICATED CONCRETE

CROSS REFERENCE TO RELATED APPLICATIONS

This application is the U.S. National Phase under 35 U.S.C. §371 of International Application No. PCT/FR2010/050438, filed on Mar. 12, 2010, which in turn claims the benefit of French Application No. 09 51547, filed on Mar. 12, 2009, the disclosures of which Applications are incorporated by reference herein. The International Application published as WO 2010/103253 on Sep. 16, 2010.

FIELD OF TECHNOLOGY

The present invention relates to a system of adjuvants for concrete particularly useful for prefabricated concrete.

Prefabricated concrete is used for producing generally by casting, concrete building elements in series such as slabs, walls, beams, frontage panels. The prefabricated concrete is generally of the reinforced concrete or pre-stressed concrete type.

By adding adjuvants, is it possible to prepare formulations of concretes adapted to technical constraints.

In prefabricated concrete formulations, the technical constraints are notably maintaining workability and early resistance. Indeed, in order to allow some flexibility during manufacturing, it is desired to be able to have some time for handling the concrete formulations after they are made, this time being called workability. However, setting should not however be delayed too much at risk of decreasing the early resistances. The early resistances designate the compressive strength $R_c$ of the material at young ages, a few hours after kneading.

For preparing prefabricated concrete parts by casting in molds, concrete formulations are thus sought in order to attain a workability of at least 30 minutes in order to allow facilitated placement and guarantee a nice face aspect and a compressive strength $R_c$ of greater than about 10 MPa after a few hours in order to allow removal from the mold and displacement of the reinforced concrete parts, or even greater than about 30 MPa after a few hours in order to allow relaxation of the pre-stress cables. Preferably, this level of strength is obtained at room temperature without heating the molds (stoving).

An object of the present invention is therefore to propose a system of adjuvants optimized for prefabricated concrete, with which a better compromise of the properties which are important in this application may be reached.

Another object of the invention was to propose a method for preparing prefabricated concretes having an optimized compromise of properties, notably as regards maintaining workability and rapidity of the rise in strength.

Finally, another object of the invention finally was to propose a use of the system of optimized adjuvants for preparing prefabricated concretes having workability of at least 30 minutes and a compressive strength Rc at 4 hours of at least 3 MPa.

The invention is based on the observation that an adjuvant system associating an accelerator, a superplasticizer and a rheology extender system allows access to concrete formulations for which the properties are a particularly interesting compromise for prefabricated concrete.

According to a first aspect, the invention therefore aims at a system of adjuvants for concrete comprising as a combination:

(a) a superplasticizer
(b) an accelerator; and
(c) a rheology extender.

The accelerator is preferably selected from calcium salts, notably from calcium nitrate, calcium nitrite, calcium chloride or calcium thiocyanate.

The superplasticizer is advantageously a comb polymer including at least the following units (I) and (II):

$$*-R1-(C(O))_m-R2-(Alk-O)_n-R3 \quad (I)$$

wherein * designates the attachment point to the backbone of the comb polymer, R1 is a chemical bond or an alkylene group with 1 to 8 carbon atoms, m is 0 or 1, R2 designates an oxygen atom or an amine group. Alk designates a linear or branched alkylene with 2 to 4 carbon atoms, n designates an integer comprised between 3 and 500, a same polymer being able to bear grafts of different lengths, and R3 designates a hydrogen atom or a hydrocarbon group such as an alkyl including from 1 to 25 carbon atoms.

$$*-R4 \quad (II)$$

wherein R4 comprises an anionic function at a pH above 10.

The rheology extender is preferably a polyalkoxylated polyphosphonate of formula (III) or one of its salts, alone or as a mixture:

$$[R-O(R_i-O)_n]_{r+q}[Q(-N\underset{A-PO_3H_2}{\overset{R_j}{\diagup}})_y] \quad (III)$$

wherein:

R is a hydrogen atom or a monovalent hydrocarbon group including from 1 to 18 carbon atoms and optionally one or more heteroatoms;

$R_i$ are similar or different from each other and represent an alkylene such as ethylene, propylene, butylene, amylene, octylene or cyclohexene, or an arylene such as styrene or methylstyrene, the $R_i$ optionally contain one or more heteroatoms;

Q is a hydrocarbon group including from 2 to 18 carbon atoms and optionally one or more heteroatoms;

A is an alkylidene group including from 1 to 5 carbon atoms;

the $R_j$ are similar or different from each other and may be selected from:

the $A-PO_3H_2$ group, A having the aforementioned meaning, the alkyl group including from 1 to 18 carbon atoms and which may bear $[R-O(R_i-O)_n]$ groups, R and $R_i$ having the aforementioned meanings, and the group $$-B-N\underset{A-PO_3H_2}{\overset{R_k}{\diagup}}$$

$R_k$ designating a group such as $R_j$, —B designating an alkylene group including from 2 to 18 carbon atoms, "n" is a number greater than or equal to 0, "r" is the number of groups $[R-O(R_i-O))_n]$ borne by the whole of the Rj, "q" is the number of groups [R—O(R$_i$O)$_n$] borne by Q, the sum "r+q" is comprised between 1 and 10.

"y" is an integer comprised between 1 and 3,

Q, N and the R$_j$ may together form one or more rings, this or these rings may further contain one or more other heteroatoms.

A polyalkoxylated polyphosphonate is particularly preferred, constituted by a water-soluble or water-dispersible organic compound including at least one amino-di-(alkylenephosphonic) group and at least one polyoxyalkylated chain or at least one of its salts.

In particular, the rheology extender may be a polyalkoxylated polyphosphonate of formula (III) wherein R is a methyl group, the R$_i$ are ethylene and propylene groups, n being comprised between 30 and 50, r+q is 1, Q is an ethylene group, A is a methylene group, y is 1 and R$_j$ corresponds to the group CH$_2$—PO$_3$H$_2$.

The system according to the invention most often comprises by dry weight based on the total binder weight, 0.3 to 4% of accelerator, 0.05 to 2% of superplasticizer and from 0.005 to 1% of rheology extender.

According to a second aspect, the invention is aimed at a method for preparing prefabricated concrete comprising the step of:

adding in a suitable amount, respectively,
(a) a superplasticizer;
(b) an accelerator and
(c) a rheology extender, simultaneously or successively to the concrete slurry during mixing.

Finally, according to a third aspect, the invention is aimed at the use of an adjuvant system described for preparing prefabricated concretes.

According to the invention, the adjuvant system includes as a combination an accelerator, a superplasticizer and a rheology extender.

Within the context of formulations for prefabricated concrete, the goal is to increase the compressive strengths at young ages (4, 6, 8 hours) while ensuring workability of at least 30 minutes and preferably of at least 45 minutes.

The accelerator is a compound having the effect of accelerating the hydration rate of the cement, thereby shortening the setting time and accelerating the strength rate of increase.

Such adjuvants are mentioned as adjuvants of class C with their performance criteria in the ASTM C494 standard.

Preferably, the accelerator is a calcium salt. Preferably the calcium salt is a calcium nitrate or a calcium nitrate or a calcium thiocyanate, or a calcium chloride or a mixture of these salts. Still more preferentially, the accelerator is a calcium nitrite.

The dosage of accelerator within the scope of the system according to the invention depends on the concrete formulation but most often it is from 0.3 to 4% by dry weight of accelerator based on the total binder weight, the total binder being defined as the sum of the weights of the cement and of the fillers.

The superplasticizer is a compound having the effect of reducing the amount of water required for obtaining a concrete having given spreading.

Such adjuvants are mentioned as adjuvants of class C with their performance criteria in the ASTM C494 standard.

Superplasticizer polymers of the polyalkoxylated polycarboxylates type are notably known for example from patent applications U.S. Pat. No. 6,858,074, EP 1 061 089 and U.S. Pat. No. 7,736,488.

Superplasticizers of the comb polymer type are particularly suitable, including at least the following units (I) and (II):

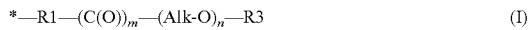

$$*—R1—(C(O))_m—(Alk-O)_n—R3 \quad (I)$$

wherein * designates the attachment point to the backbone of the comb polymer, R1 is a chemical bond or an alkylene group with 1 to 8 carbon atoms, m is 0 or 1, R2 designates an oxygen atom or an amine group, Alk designates a linear or branched alkylene with 2 to 4 carbon atoms (this is understood in a wide sense, several types of alkylenes may be present on the same graft or on the same polymer), n designates an integer comprised between 3 and 500, a same polymer being able to bear grafts of different lengths, and R3 designates a hydrogen atom or a hydrocarbon group such as an alkyl including from 1 to 25 carbon atoms.

$$*—R4 \quad (II)$$

wherein R4 comprises an anionic function at a pH above 10. These functions may notably be carboxylic functions or sulfonate functions.

By superplasticizer of the comb polymer type is also meant superplasticizers obtained by mixing different polymers including the units of type (I) and (II).

The superplasticizer dosage notably depends on the amounts of cement and on the accelerator dosage. Most often, it is expressed as dry material of superplasticizer based on the accumulated weight of the cement and of the accelerator, from 0.05 to 2% and preferably from 0.1 to 1%, typically about from 0.125 to 0.6%.

A rheology extender is a compound which has the effect of extending the workability of a concrete, while maintaining the spreading of the fresh concrete for a given duration.

Unlike a retarder, a rheology extender allows extension of the workability of the concrete without however generating a great delay in setting.

Preferred rheology extenders within the scope of the invention are polyalkoxylated polyphosphonates described in patent application FR-2696736. A polyalkoxylated polyphosphonate of formula (III) or one of its salts, alone or as a mixture, is therefore particularly preferred as a rheology extender.

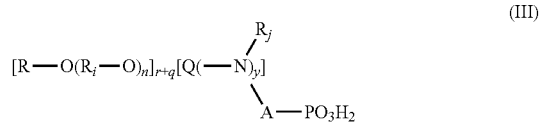

$$[R—O(R_i—O)_n]_{r+q}[Q(—N)_y] \quad (III)$$
with R$_j$ and A—PO$_3$H$_2$ branches wherein:

R is a hydrogen atom or a monovalent hydrocarbon group including from 1 to 18 carbon atoms and optionally one or more heteroatoms;

the R$_i$ are similar or different from each other and represent an alkylene such as ethylene, propylene, butylenes, amylene, octylene or cyclohexene, or an arylene such as styrene or methylstyrene, the R$_i$ optionally contain one or more heteroatoms;

Q is a hydrocarbon group including from 2 to 18 carbon atoms and optionally one or more heteroatoms;

A is an alkylidene group including from 1 to 5 carbon atoms;

the R$_j$ are similar or different from each other and may be selected from:

the A—PO$_3$H$_2$ group, A having the aforementioned meaning, the alkyl group including from 1 to 18 carbon atoms and which may bear [R—O(R$_i$—O)$_n$] groups, R and R$_i$ having the aforementioned meanings,
and the group

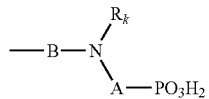

R$_k$ designating a group such that R$_j$, —B designating an alkylene group including from 2 to 18 carbon atoms, "n" is a number greater than or equal to 0, "r" is the number of [R—O(R$_i$—O)$_n$] groups borne by the whole of the Rj, "q" is the number of [R—O(R$_i$O)$_n$] groups borne by Q, the sum "r+q" is comprised between 1 and 10, "y" is an integer comprised between 1 and 3, Q, N and the R$_j$ may form together one or more rings, this or these rings may further contain one or more heteroatoms.

For example, the polyalkoxylated polyphosphonate may consist of a water-soluble or water-dispersible organic compound, including at least one amino-di-(alkylene-phosphonic) group and at least one polyoxyalkylated chain or at least one of its salts.

The rheology extender dosage especially depends on the amount of cement and on the accelerator system. Most often, it is expressed as dry material of extender based on the total binder weight (cement+filler and/or cement additions), from 0.005 to 1% and preferably from 0.01 to 0.2%, typically about 0.015 to 0.15%.

A system consisting of the three components described above, other adjuvants being excluded, at the very least adjuvants which may affect the workability and early strength, is particularly preferred.

The object of the invention is also a method for preparing prefabricated concrete comprising the step of adding in a suitable amount respectively (a) a superplasticizer (b) an accelerator; and (c) a rheology extender, simultaneously or successively to the concrete slurry.

Advantageously the adjuvant system is added to the concrete composition during mixing, preferably by adding it to the mixing water. Alternatively, the adjuvants may be added to the solid components of the concrete, notably to the cement and/or to the sand, but their homogenization may be more difficult.

The addition may equally be carried out simultaneously or successively, the simplest being generally successively weighing the adjuvants before introducing them into the mixing water.

Of course, other customary adjuvants known to one skilled in the art may also be added to the concrete composition. As an example mention may be made of air-entraining agents and anti-foaming agents.

However, it is important in order to preserve the compromise of sought properties, not to add any other adjuvants having an effect on the setting time, and notably not any setting retarder. Indeed, delaying setting delays the rise in strength and therefore does not give the possibility of obtaining sought compressive strength values at young ages.

The concrete compositions for which the system of adjuvants according to the invention may be useful, may comprise as a hydraulic binder, different types of cements, such as for example the cements CEM I, CEM II, CEM III, CEM V as described in the EN 197-1 standard. Among the latter, CEM I cements do not include any additions. Nevertheless it is possible to add additions like slags, flying ashes, lime fillers, siliceous fillers to these cements. The concrete compositions may be concrete of different resistance classes, such as from C25/30 to C50/60.

The invention will be described in more detail by means of the following examples.

EXAMPLES

The performances of the adjuvant systems according to the invention, including a superplasticizer (SP), an accelerator (X) and a rheology extender (Y) in terms of workability and early r strength have been compared with those of comparative examples for a concrete composition of the following formulation based on 1 m$^3$:

| | |
|---|---|
| Portland cement CEM I 52,5 R (SPLC) | 400 kg |
| Filler La Tour Blanche | 130 kg |
| Sand 0-4 from the Bernieres site | 810 kg |
| Ballast 4/8 from the Villermain site | 280 kg |
| Alluvial gravel 8/16 from the Loire | 525 kg |
| Water | 175 L |

The cement used is cement from Saint Pierre La Cour produced by Lafarge, which is of the CEM I 52,5R type according to the EN 197-1 standard.

The concentrations of the adjuvants are respectively expressed as a percentage of dry extract based on the amount of total binder (cement+filler and/or cement additions).

(a) Measurement of the Spreading

The workability was evaluated by measuring the slump diameter (slump flow). The test is conducted with an Abrams cone according to the EN 12350-2 standard. The test consists of filling with freshly prepared concrete a mold without any bottom with a frustro-conical shape of the following dimensions:

| | |
|---|---|
| diameter of the circle of the upper base | 100 +/− 0.5 mm |
| diameter of the circle of the lower base | 200 +/− 0.5 mm |
| height | 300 +/− 0.5 mm. |

The cone is lifted vertically. The slump is measured at 5, 15, 30 and 45 minutes along four diameters at 45° with a vernier caliper. The result of the slump measurement is the average of four values to within +/−10 mm. The tests are conducted at 20° C.

(b) Measurement of the Compressive Strength Rc

The early strength is evaluated by measuring the compressive strength Rc of concrete specimens at terms of 2, 4, 6, 8 and 24 hours at the temperature of 20° C., according to the PR NF EN 12390-3 standard (Test for hardened concrete—Part 3 compressive strength of the specimens).

Example A

Superplasticizer Alone

A concrete formulation is prepared according to the indications above by adding to the mixing water an adjuvant system only including one superplasticizer (SP, CHRYSOFluid Premia 196, marketed by CHRYSO) in the amount indicated in Table 1.

The results of the evaluation of the concrete formulation are grouped in Tables 1 and 2. They show that maintaining workability is ensured over 45 minutes, but that the strength allowing removal of the parts from the mold is only reached after 6 h.

Examples B and C

Superplasticizer Combined with the Accelerator

Two concrete formulations are prepared with an adjuvant system comprising a superplasticizer (SP, CHRYSOFluid Premia 196, marketed by CHRYSO) and an accelerator (X, an 30 weight % aqueous solution of calcium nitrate), the latter being used at a dosage of 5% by weight of dry material, for Example B and of 9% for Example C. OK for the values.

The results of the evaluation of the concrete formulation are grouped in Tables 1 and 2. By adding the superplasticizer and accelerator, it is possible to ensure an early very high strength, all the more so since the accelerator dosage is increased (example C). However, the improvement of the strength is made to the detriment of the workability, which leads to a practical duration of use of the formulation comprised between only 15 and 30 minutes.

Example D

Accelerator Combined with a Rheoloqy Extender

A concrete formulation is prepared as in the previous examples but with an adjuvant system comprising an accelerator (X, 30 weight % aqueous solution of calcium nitrite) and a rheology extender (Y, CHRYSOFluid Optima 100 marketed by CHRYSO).

The results of the evaluation of the concrete formulation are grouped in Tables 1 and 2.

It is seen that in the absence of the superplasticizer, it is necessary to notably increase the dosage of rheology extender in order to obtain workability ensuring a practical duration of use comprised between 30 and 45 minutes. Moreover, it is noted that at the same accelerator dosage, the early strength is significantly altered as compared with Example C.

Example E

Superplasticizer Combined with a Rheoloqy Extender

A concrete formulation is prepared as in the previous examples but with an adjuvant system now comprising a superplasticizer (SP, CHRYSOFluid Premia 196, marketed by CHRYSO) and a rheology extender (Y, CHRYSOFluid Optima 100 marketed by CHRYSO).

The results of the evaluation of the concrete formulation are grouped in Tables 1 and 2.

It is seen that in the absence of any accelerator, the adjuvant system ensures satisfactory workability but the early strengths are insufficient.

Examples 1 and 2

A Superplasticizer Combined with an Accelerator and a Rheology Extender

A concrete formulation is prepared as in the previous examples with an adjuvant system comprising a superplasticizer (SP, CHRYSOFluid Premia 196, marketed by CHRYSO), an accelerator (X, $Ca(NO_2)_2$) and a rheology extender (Y, CHRYSOFluid Optima 100 marketed by CHRYSO) in the dosages indicated in Table 1.

It is seen as in Example D that the rheology extender causes an improvement in maintaining workability.

This combination of adjuvants shows a compromise between satisfactory maintaining of rheology over a duration of 30 minutes accompanied by mechanical performances of a very good level both at the term of 4 hours and at the term of 6 and 8 hours.

Further, it is noted that the system according to the present invention by providing a low dosage of rheology extender of less than 0.3% gives the possibility of maintaining the early strength to a level which widely exceeds the specifications of the prefabrication.

TABLE 1

| | | | | Workability (20° C.) | | | |
| --- | --- | --- | --- | --- | --- | --- | --- |
| | | | | | Slump (mm) | | |
| Ex | SP % | X % | Y % | 5 min | 15 min | 30 min | 45 min |
| 1 | 0.17 | 2.7 | 0.06 | 705 | 715 | 615 | 550 |
| 2 | 0.17 | 2.7 | 0.12 | 730 | 740 | 735 | 670 |
| A | 0.19 | — | — | 710 | 710 | 700 | 690 |
| B | 0.19 | 1.5 | — | 725 | 720 | 710 | 680 |
| C | 0.19 | 2.7 | — | 720 | 680 | 410 | — |
| D | — | 2.7 | 0.6 | 715 | 720 | 700 | 700 |
| E | 0.17 | — | 0.12 | 720 | 710 | 720 | 710 |

From the results grouped in Table 1 it is seen that the slump values are insufficient for the adjuvant system according to Example C, only including a superplasticizer and an accelerator. The additional presence of a rheology extender allows a return to acceptable slump values.

TABLE 2

| | | | | Early strengths (20° C.) | | | | |
| --- | --- | --- | --- | --- | --- | --- | --- | --- |
| | | | | | | Rc (MPa) | | |
| Ex | SP % | X % | Y % | 2 h | 4 h | 6 h | 8 h | 24 h |
| 1 | 0.17 | 2.7 | 0.06 | <1.5 | 6.5 | 15.5 | 22 | 49.5 |
| 2 | 0.17 | 2.7 | 0.12 | — | 1.6 | 7.5 | 15.5 | 49.1 |
| A | 0.19 | — | — | — | — | 4 | 10 | 49.5 |
| B | 0.19 | 1.5 | — | — | — | 5 | 9 | 47 |
| C | 0.19 | 2.7 | — | — | 11 | 18 | 27 | 50 |
| D | — | 2.7 | 0.6 | — | — | — | 6 | 49.5 |
| E | 0.17 | — | 0.12 | — | — | — | 2 | 45 |

From the results grouped in Table 2, great differences are noted between the values between 4 h and 8 h while these values converge at 24 h. The additional addition of an accelerator and a rheology extender therefore does not affect the final compressive strength value of the material.

However, it is seen that the compressive strength at 4 h, 6 h and 8 h of the formulations prepared with the systems according to Examples A and B, not containing or containing very little accelerator, is clearly insufficient.

On the other hand, it is noted that by adding a superplasticizer, an accelerator and a rheology extender combined together, it is possible to end up with a compromise of properties in terms of maintaining workability and early strength notably of interest for prefabricated concretes.

The invention claimed is:

1. An adjuvant system for concrete comprising as a combination of:
   (a) a superplasticizer;
   (b) an accelerator, wherein the accelerator is selected from calcium salts; and
   (c) 0.005 to 0.2% by dry weight based on the total binder weight of a rheology extender, wherein the rheology extender is a polyalkoxylated polyphosphonate of formula (III) or one of its salts, alone or as a mixture:

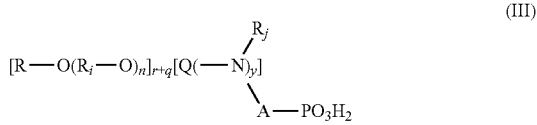
(III)

wherein:
R is a hydrogen atom or a monovalent hydrocarbon group including from 1 to 18 carbon atoms and optionally one or more heteroatoms;
the $R_i$ are similar or different from each other and represent an alkylene such as ethylene, propylene, butylene, amylene, octylene or cyclohexene, or an arylene such as styrene or methylstyrene, the $R_i$ optionally contain one or more heteroatoms;
Q is a hydrocarbon group including from 2 to 18 carbon atoms and optionally one or more heteroatoms;
A is an alkylidene group including from 1 to 5 carbon atoms;
the $R_j$ are similar or different from each other and may be selected from:
   the A-$PO_3H_2$ group, A having the aforementioned meaning,
   the alkyl group including from 1 to 18 carbon atoms and being able to bear [R—O($R_i$—O)$_n$] groups, R and $R_i$ having the aforementioned meanings,
   and the group

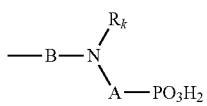

$R_k$ designating a group such as $R_j$, —B designating an alkylene group including from 2 to 18 carbon atoms,
"n" is a number greater than or equal to 0,
"r" is the number of [R—O($R_i$—O)$_n$] groups borne by the whole of the Rj,
"q" is the number of [R—O($R_i$O)$_n$] groups borne by Q, the sum
"r+q" is comprised between 1 and 10,
"y" is an integer comprised between 1 and 3,
Q, N and the $R_j$ may form together one or more rings, this or these rings may further contain one or more other heteroatoms,
whereby the system provides concrete with a workability of more than 30 minutes and a compressive strength Rc at 4 hours sufficient for removal from the mould.

2. The system according to claim 1, wherein the accelerator is selected from calcium nitrate, calcium nitrite, calcium thiocyanate, or mixtures thereof.

3. The system according to claim 1, wherein the superplasticizer is a comb polymer including at least the following units (I) and (II):

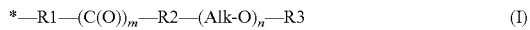

wherein * designates the attachment point to the backbone of the comb polymer, R1 is a chemical bond or an alkylene group with 1 to 8 carbon atoms, m is 0 or 1, R2 designates an oxygen atom or an amine group, Alk designates an linear or branched alkylene with 2 to 4 carbon atoms, n designates an integer comprised between 3 and 500, a same polymer being able to bear grafts of different lengths, and R3 designates a hydrogen atom or a hydrocarbon group such as an alkyl including from 1 to 25 carbon atoms,

wherein R4 comprises an anionic function with a pH above 10.

4. The system according to claim 1, wherein the polyalkoxylated polyphosphonate of formula (III) is constituted by a water-soluble or water-dispersible organic compound including at least one amino-di-(alkylene-phosphonic) group and at least one polyalkoxylated chain or at least one of its salts.

5. The system according to claim 4, wherein in the polyalkoxylated polyphosphonate of formula (III), R is a methyl group, the $R_i$ are ethylene and propylene groups, n is between 30 and 50, r+q is 1, Q is an ethylene group, A is a methylene group, y is 1 and $R_j$ corresponds to the $CH_2$—$PO_3H_2$ group.

6. The system according to claim 1, comprising 0.3 to 4% of accelerator, 0.05 to 2% of superplasticizer and 0.01 to 0.2% of rheology extender expressed as dry weight based on the weight of total binder.

7. A method for preparing prefabricated concrete comprising the step of adding in a suitable amount, respectively,
   (a) a superplasticizer;
   (b) an accelerator; and
   (c) 0.005 to 0.2% by dry weight based on the total binder weight of a rheology extender,
simultaneously or successively, to the concrete slurry, wherein
   the accelerator is selected from calcium salts, and
   the rheology extender is a polyalkoxylated polyphosphonate of formula (III) or one of its salts, alone or as a mixture:

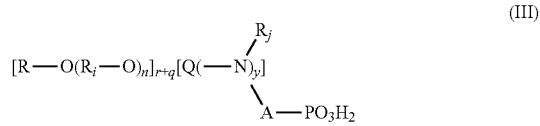
(III)

wherein:
R is a hydrogen atom or a monovalent hydrocarbon group including from 1 to 18 carbon atoms and optionally one or more heteroatoms;
the $R_i$ are similar or different from each other and represent an alkylene such as ethylene, propylene, butylene, amylene, octylene or cyclohexene, or an arylene such as styrene or methylstyrene, the $R_i$ optionally contain one or more heteroatoms;
Q is a hydrocarbon group including from 2 to 18 carbon atoms and optionally one or more heteroatoms;
A is an alkylidene group including from 1 to 5 carbon atoms;

the $R_j$ are similar or different from each other and may be selected from:
the A-PO$_3$H$_2$ group, A having the aforementioned meaning,
the alkyl group including from 1 to 18 carbon atoms and being able to bear [R—O(R$_i$—O)$_n$] groups, R and R$_i$ having the aforementioned meanings,
and the group

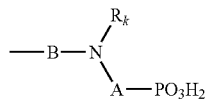

$R_k$ designating a group such as $R_j$, —B designating an alkylene group including from 2 to 18 carbon atoms,
"n" is a number greater than or equal to 0,
"r" is the number of [R—O(R$_i$O)$_n$] groups borne by the whole of the Rj,
"q" is the number of [R—O(R$_i$O)$_n$] groups borne by Q, the sum
"r+q" is comprised between 1 and 10,
"y" is an integer comprised between 1 and 3,
Q, N and the R$_j$ may form together one or more rings, this or these rings may further contain one or more other heteroatoms,
whereby the system provides concrete with a workability of more than 30 minutes and a compressive strength Rc at 4 hours sufficient for removal from the mould.

8. The method according to claim 7, wherein the accelerator is selected from calcium nitrate, calcium nitrite, calcium thiocyanate, or mixtures thereof.

9. The method according to claim 7, wherein the superplasticizer is a comb polymer including at least the following units (I) and (II):

$$*—R1—(C(O))_m—R2—(Alk-O)_n—R3 \quad (I)$$

wherein * designates the attachment point to the backbone of the comb polymer, R1 is a chemical bond or an alkylene group with 1 to 8 carbon atoms, m is 0 or 1, R2 designates an oxygen atom or an amine group, Alk designates an linear or branched alkylene with 2 to 4 carbon atoms, n designates an integer comprised between 3 and 500, a same polymer being able to bear grafts of different lengths, and R3 designates a hydrogen atom or a hydrocarbon group such as an alkyl including from 1 to 25 carbon atoms, $$*—R4 \quad (II)$$

wherein R4 comprises an anionic function with a pH above 10.

10. The method according to claim 7, wherein the polyalkoxylated polyphosphonate of formula (III) is constituted by a water-soluble or water-dispersible organic compound including at least one amino-di-(alkylene-phosphonic) group and at least one polyalkoxylated chain or at least one of its salts.

11. The method according to claim 7, wherein in the polyalkoxylated polyphosphonate of formula (III), R is a methyl group, the R$_i$ are ethylene and propylene groups, n being comprised between 30 and 50, r+q is 1, Q is an ethylene group, A is a methylene group, y is 1 and R$_j$ corresponds to the CH$_2$—PO$_3$H$_2$ group.

12. The method according to claim 7, comprising 0.3 to 4% of accelerator, 0.05 to 2% of superplasticizer and 0.01 to 0.2% of rheology extender expressed as dry weight based on the weight of total binder.

13. The adjuvant system according to claim 1, wherein the rheology extender is present in an amount from 0.01 to 0.2% by dry weight based on the total binder weight.

14. The method according to claim 7, wherein the rheology extender is present in an amount from 0.01 to 0.2% by dry weight based on the total binder weight.

* * * * *